United States Patent
Yang et al.

(10) Patent No.: US 12,107,285 B2
(45) Date of Patent: *Oct. 1, 2024

(54) SYSTEMS AND METHODS FOR RESPONDING TO THERMAL EXCURSIONS IN A BATTERY

(71) Applicant: GM GLOBAL TECHNOLOGY OPERATIONS LLC, Detroit, MI (US)

(72) Inventors: Xiaofeng Yang, Troy, MI (US); Jian Gao, Auburn Hills, MI (US); Scott E Parrish, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 15 days.

This patent is subject to a terminal disclaimer.

(21) Appl. No.: 17/647,964

(22) Filed: Jan. 13, 2022

(65) Prior Publication Data

US 2023/0223630 A1    Jul. 13, 2023

(51) Int. Cl.
*H01M 50/211* (2021.01)
*H01M 10/6561* (2014.01)

(52) U.S. Cl.
CPC ..... *H01M 50/211* (2021.01); *H01M 10/6561* (2015.04)

(58) Field of Classification Search
CPC ............ H01M 50/105; H01M 50/119; H01M 50/121; H01M 50/124; H01M 50/133; H01M 50/211; H01M 50/557; H01M 50/3425; Y02E 60/10
See application file for complete search history.

(56) References Cited

U.S. PATENT DOCUMENTS

| 8,785,024 B2 | 7/2014 | Han et al. | |
|---|---|---|---|
| 8,968,904 B2 | 3/2015 | Han et al. | |
| 9,196,935 B2 | 11/2015 | Han et al. | |
| 2003/0077505 A1* | 4/2003 | Goda | H01M 50/119 |
| | | | 429/82 |
| 2009/0162737 A1* | 6/2009 | Lai | H01M 50/503 |
| | | | 429/56 |
| 2012/0177961 A1* | 7/2012 | Lee | H01M 50/103 |
| | | | 429/82 |

(Continued)

FOREIGN PATENT DOCUMENTS

CN    206134742 U   *  4/2017

OTHER PUBLICATIONS

CN206134742U, Wang et al., "Lithium ion battery cover plate and use lithium ion battery of this apron", machine English translation retrieved from https://worldwide.espacenet.com/ Date: Sep. 12, 2023 (Year: 2017).*

*Primary Examiner* — Matthew T Martin
*Assistant Examiner* — Jared Hansen
(74) *Attorney, Agent, or Firm* — Lorenz & Kopf LLP

(57) ABSTRACT

Systems and methods for responding to in a battery. A battery cell for a battery system includes a core of a known battery type, and a cell film having an initial thickness, the cell film configured as a pouch enclosing the core. The battery cell has at least one engraved groove in the cell film, the at least one engraved groove characterized by a groove thickness that is less than the initial thickness. The groove thickness configured to break open responsive to a predetermined gas pressure or target temperature in the pouch.

20 Claims, 3 Drawing Sheets

(56) References Cited

U.S. PATENT DOCUMENTS

| | | | |
|---|---|---|---|
| 2015/0093608 A1* | 4/2015 | Seong | H01M 10/0413 |
| | | | 429/56 |
| 2016/0028057 A1* | 1/2016 | Kanamori | H01M 50/3425 |
| | | | 429/56 |
| 2021/0143492 A1* | 5/2021 | Zagrodnik | H01M 50/249 |
| 2021/0159473 A1 | 5/2021 | Han et al. | |
| 2021/0296625 A1* | 9/2021 | Li | H01M 50/124 |
| 2021/0376411 A1 | 12/2021 | Yen et al. | |
| 2022/0158273 A1* | 5/2022 | Khateeb Razack | |
| | | | H01M 10/617 |
| 2022/0223973 A1* | 7/2022 | Song | H01M 50/375 |
| 2022/0320696 A1* | 10/2022 | Li | H01M 50/367 |
| 2023/0113132 A1* | 4/2023 | Xu | H01M 50/143 |
| | | | 429/163 |
| 2023/0352794 A1* | 11/2023 | Osafune | H01M 50/15 |

* cited by examiner

SYSTEMS AND METHODS FOR RESPONDING TO THERMAL EXCURSIONS IN A BATTERY

The present disclosure relates to battery systems, and more particularly to systems and methods for responding to thermal excursions in a battery of an electric vehicle.

Electrified vehicles, including battery electric vehicles (BEVs) generally rely on a battery system that includes one or more battery modules. Each of the battery modules may include one or more battery cells. An on-board battery management system is generally configured to control charging and/or discharging of the battery modules during charging and/or driving. During driving, one or more electric motors of the electrified vehicle receive power from the battery system to provide propulsion for the vehicle and/or to return power to the battery system during regeneration.

Outcomes such as battery faults, are technical problems that may occur during operation of the BEV, if the battery system experiences transient heat excursions, which may occur in either the charging or discharging phase of operation. Heat may impair operation of a battery cell, its neighbor battery cells, and the battery system overall. In addition, battery life of the battery system may be adversely affected if the battery system is operated for extended periods of time at temperatures that are higher than specified operating temperatures for the battery cells therein.

Some battery systems provide a technical solution to this problem using battery cooling systems that attempt to constrain the temperature of the battery cells to a predetermined temperature range. The predetermined temperature range may be set to a normal operating temperature range for a specific battery type. In a non-limiting example, a lithium-ion battery may have a normal operating temperature range from 45° C. to 50° C. However, some scenarios expose the battery cell to heat beyond what the available battery cooling system can control.

Accordingly, improvements to battery cells and systems are desirable. The following disclosure provides a technological solution to these technical problems, in addition to addressing related issues. Furthermore, other desirable features and characteristics of the systems will become apparent from the subsequent detailed description and the appended claims, taken in conjunction with the accompanying drawings and the preceding background

SUMMARY

Provided is an embodiment of a battery cell. The battery cell includes: a core of a battery type; a cell film having an initial thickness, the cell film configured as a pouch enclosing the core; at least one groove in the cell film, the at least one groove characterized by a groove thickness that is less than the initial thickness; the groove thickness configured to break open responsive to a predetermined gas pressure in the pouch.

In an embodiment, the predetermined gas pressure is selected to represent a threshold below which the pouch remains intact for the core of the battery type.

In an embodiment, the pouch is characterized by two equally sized wide lateral sides.

In an embodiment, the pouch is further characterized by two equally sized narrow lateral sides, a top and a bottom.

In an embodiment, the at least one groove comprises a groove design.

In an embodiment, the groove design includes a substantially rectangular shape having a length of plus or minus 20% of a perimeter of a wide lateral sides.

In an embodiment, the at least one groove is further characterized by a groove placement, and the groove placement includes a groove on each of two wide lateral sides.

In an embodiment, the at least one groove is further characterized by a groove placement, and the groove placement includes a groove on each of two narrow lateral sides.

In an embodiment, the at least one groove is further characterized by a groove placement, and the groove placement further includes a first and a second groove, arranged concentrically on the cell film.

Also provided is a method for making a battery cell for a battery core, including: enclosing the battery core within a cell film configured as a pouch, the cell film having an initial thickness; creating at least one groove by thinning an area of the cell film to a groove thickness that is less than the initial thickness; configuring the groove thickness to break open responsive to a predetermined gas pressure.

In an embodiment, the method further comprising selecting the predetermined gas pressure to represent an undesired thermal excursion for the battery core as a function of a battery type.

In an embodiment, the method further comprising forming the pouch to include two equally sized wide lateral sides.

In an embodiment, the method further comprising forming the pouch to include two equally sized narrow lateral sides, a top and a bottom.

In an embodiment, the method further comprising creating to further have a groove design.

In an embodiment, the method the groove design includes a substantially rectangular shape having a length of plus or minus 20% of a perimeter of a wide lateral side of the pouch.

In an embodiment, the method comprising placing a groove on each of two wide lateral sides.

In an embodiment, the method comprising placing a groove on each of two narrow lateral sides.

In an embodiment, the at least one groove is further characterized by a groove placement, and the groove placement further includes a first and a second groove, arranged concentrically on the cell film.

Additionally, a battery module is provided. The battery module including: a plurality of battery cells, each battery cell comprising a respective core of a battery type and a cell film having an initial thickness, the cell film configured as a pouch enclosing the respective core; at least one battery cell further comprising at least one groove in the respective, the at least one groove characterized by a groove thickness that is less than the initial thickness; the groove thickness configured to break open responsive to a target temperature in the respective core.

In an embodiment, the target temperature is selected to represent for the core of the battery type, and the at least one groove has a length of plus or minus 20% of a perimeter of a wide lateral side of the pouch.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
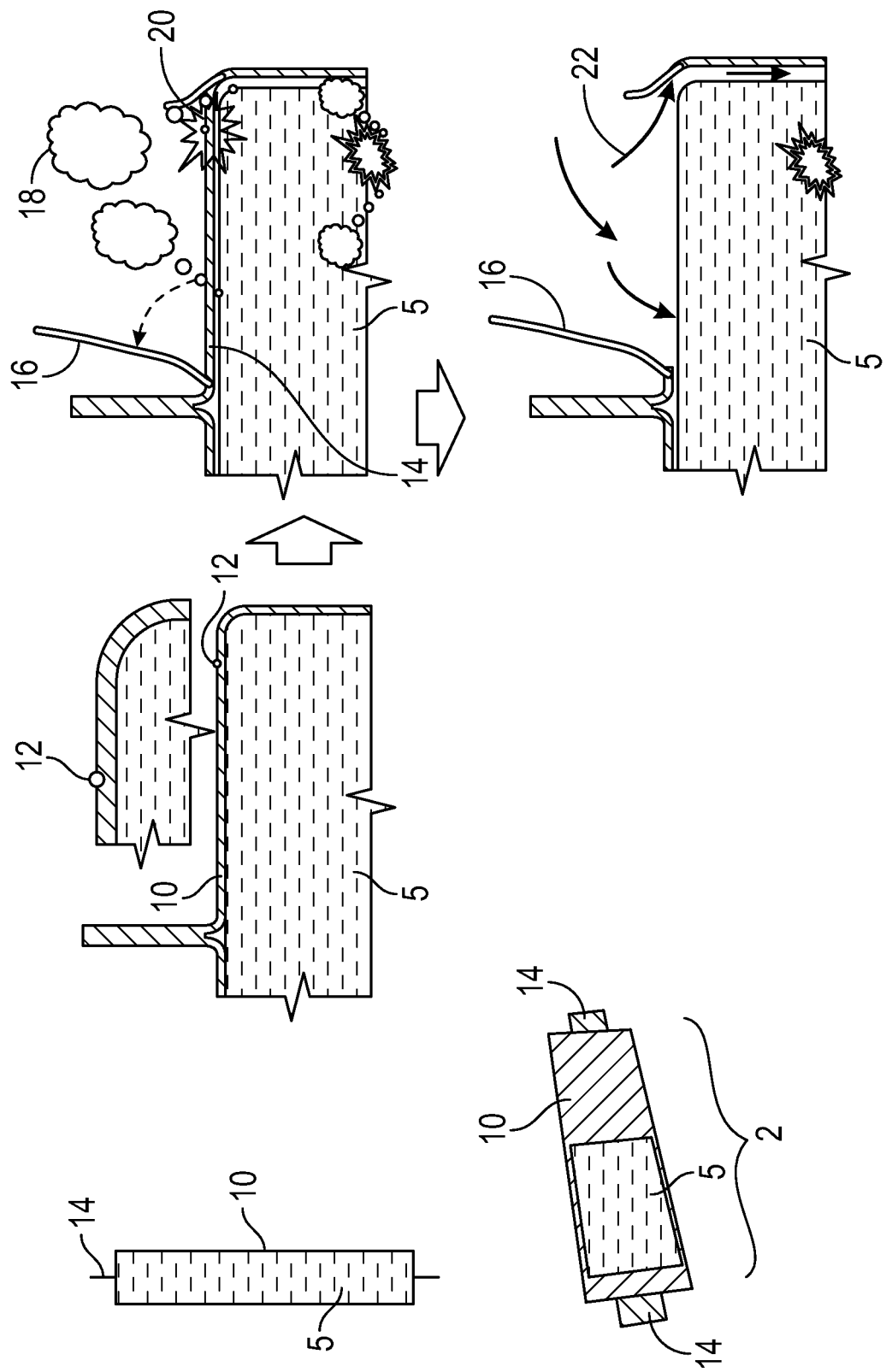
FIG. 1 provides perspective and cross-sectional views of a battery cell, in accordance with various embodiments of the present disclosure.

The following detailed description is merely exemplary in nature and is not intended to limit the application and uses. Furthermore, there is no intention to be bound by any expressed or implied theory presented in the preceding technical field, background, summary, or the following detailed description.

As used herein, the term "module" may refer to any hardware, circuit, software, firmware, electronic control component, processing logic, and/or processor device, individually or in any combination. In various embodiments, a module is one or more of: an application specific integrated circuit (ASIC), a field-programmable gate-array (FPGA), an electronic circuit, a computer system comprising a processor (shared, dedicated, or group) and memory that executes one or more software or firmware programs, a combinational logic circuit, and/or other suitable components that provide the functionality attributed to the module.

While a battery cell and battery system for responding to thermal excursion in battery cells of a battery system is described below in the context of a (BEV), the present disclosure is applicable to battery cells and battery systems of hybrid or other vehicles and/or in other non-vehicle implementations.

As mentioned, battery fault conditions caused by heat excursions are undesirable technical problems for battery systems. One example battery fault condition is thermal excursion. Battery thermal excursion refers to a chemical process that is accelerated by increased temperature of the battery cell, this is relevant to battery cells, including those that are of the lithium-ion (Li-ion) type. The increased temperature in the core releases gasses and energy, which, in turn, releases more energy that further increases temperature. A pouch that encloses the core of the battery cell may rupture if its internal pressure exceeds the capacity of the sealed pouch.

The released gasses, referred to as vent gases, are often precursors to battery thermal excursion. Vent gases may include carbonate produced by evaporation of electrolyte and/or a gas produced by the battery cell when the battery cell is heated above a predetermined temperature range. Non-limiting examples of causes for battery thermal excursion include battery cell thermal failure, battery cell mechanical failure, internal/external short-circuiting in a battery cell, and/or electrochemical abnormalities.

A battery system may include one or more battery modules. The battery system may include a battery management system and may arrange battery modules into a pack. The battery module may include one or more battery cells arranged in a housing. In some embodiments of the battery system, the housing is at least partially filled with a thermal control fluid such as a water, a dielectric, or another fluid. In a healthy battery system, the pouches that enclose individual battery cores are sealed to not allow the thermal control fluid to contact components in the pouch (i.e., the battery core). During a thermal excursion event inside a battery module, at least one pouch may rupture from the increased pressure caused by vent gasses. When a pouch ruptures, the thermal control fluid enters the rupture opening and contacts components of the respective battery core to thereby stop thermal excursion. While the thermal coolant contact is a desirable response to a thermal excursion, a rupture in an unplanned location is undesirable.

Figure 2:
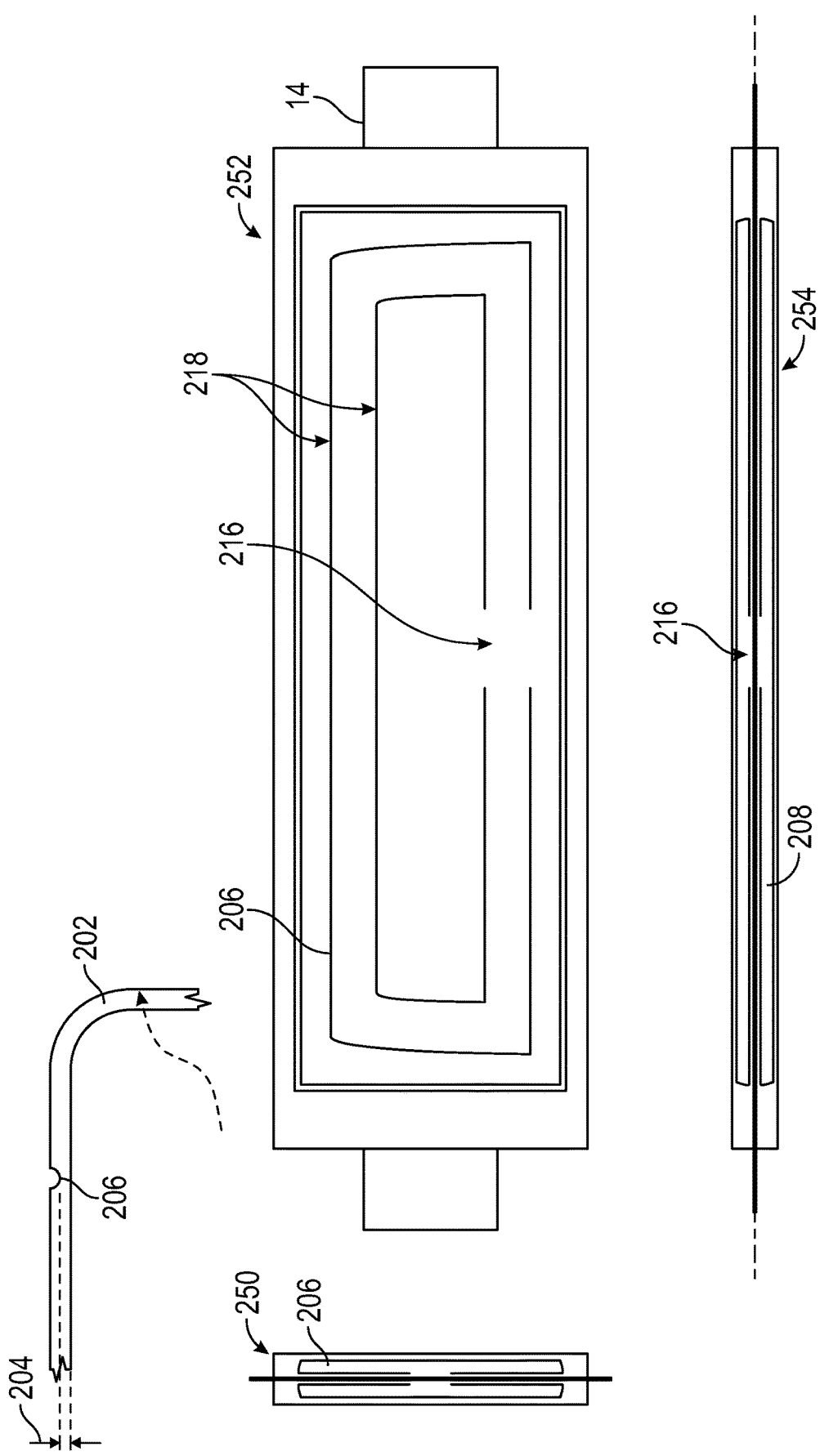
FIG. 2 provides perspective and cross-sectional views showing placement of pressure-sensitive engraved grooves on the battery cell, in accordance with various embodiments of the present disclosure.

Embodiments as described herein provide technical solutions to thermal excursion in battery cells. Referring now to FIGS. 1 and 2, embodiments include at least one battery cell 2, such as a sealed pouch battery cell, which includes a core 5. The core includes components of the battery cell for a respective battery type, such as the anode, separator, cathode and/or electrolyte. The core 5 is enclosed in cell film 10, such as aluminum laminated film, forming the aforementioned enclosure or pouch. Terminals 14 extend from the battery cell 2 on opposite sides thereof. While the illustration is not to scale, the general relationships may be relied on, such as, for the at least one battery cell 2, the pouch formed by the cell film 10 is narrow and substantially rectangular, as illustrated. The cell film 10 may define a top side, a bottom side and four lateral sides of the pouch. The pouch is sealed around the core and the terminals 14, which extend therefrom.

Embodiments of the battery cell 2 place engraved grooves 12 in predetermined locations on the cell film 10. The engraved grooves 12 are created by thinning an area on the cell film 10, with respect to a remaining area of the cell film 10. The engraved grooves 12 advantageously serve as a pressure sensitive valve, which breaks open responsive to a configurable thermal excursion event. Each of at least one engraved groove 12 is characterized by a design having dimensions and a location, as is described in more detail below. As is illustrated in FIGS. 1-2, the area, or dimensions, taken up by an engraved groove 12 is generally narrow in width and long in length, including at least one change in direction in the length measurement, with respect to the geometry of the cell film pouch that they are placed on. The engraved groove 12 is configured to provide a deliberately located pressure sensitive area in the cell film 10 (i.e., functioning as a pressure sensitive valve).

As mentioned, as the temperature of the battery cell 2 increases, the components within the battery cell 2 heat up, generating gasses 18, which raise pressure within the enclosure of the battery cell 2, which may initiate thermal excursion 20. Embodiments are configured such that, at a predetermined vent gas pressure, the engraved groove 12 opens as a pressure sensitive valve. In various embodiments, the engraved groove 12 is also configured to provide a tab that will secure one side of a flap 16 of cell film 10 that lifts away from the battery cell 2 under the pressure of the vent gasses. As described, a thermal control fluid 22 in the battery module flows in and contacts the core 5 through the opening in the cell film 10.

FIG. 2 depicts the battery cell 2 using two-dimensional views to create a three-dimensional battery cell. The pouch surrounding the core comprises two wide lateral sides 252, two narrow lateral sides 250, and a top and a bottom 254. As mentioned, the core is completely enclosed in a cell film configured as a pouch, with only terminals 14 extending therefrom. The pouch is initially sealed, preventing fluid flow to the core.

The cell film 202 has an initial thickness. Embodiments place at least one engraved groove (grooves 206 and grooves 208) in the cell film 202, characterized by a groove thickness 204 that is less than the initial thickness. Placing the engraved groove is performed by thinning the cell film 202 in an area; thinning may be performed mechanically or chemically. The engraved groove is configured to have a groove thickness 204 that serves as a pressure sensitive valve that will break open at a predetermined vent gas pressure value (shortened herein to predetermined gas pressure) inside the pouch. In a non-limiting embodiment, the groove thickness 204 is less than 0.075 millimeters, and the initial thickness is 0.5 millimeters.

In various embodiments, the predetermined gas pressure is selected to be greater than a normal pressure caused by normal heating that is experienced by the battery cell 2 of its battery type during normal operation. Accordingly, provided embodiments assure that the thinned cell film 10, in a location of an engraved groove 12, will open responsive to the predetermined gas pressure.

The predetermined gas pressure, or a higher gas pressure, will occur in the battery cell 2 responsive to the battery cell 2 experiencing temperatures exceeding a target temperature that is above a normal operating temperature range for the respective battery type. In a non-limiting example, a normal operating temperature for a battery cell may be 45° C. to 50° C., and the target temperature may be selected as greater than or equal to 80° C. In some scenarios, the pressure of the vent gases when the temperature is equal to the target temperature exceeds the predicted predetermined pressure. Accordingly, in various embodiments, the groove thickness may be configured as a pressure sensitive valve that will break open responsive to a target temperature in the respective core. A non-limiting example of the predetermined gas pressure to sufficiently cause the engraved groove 12 to break open is a range from 2 to 4 bar (e.g., 2 or 3 bar). As may be appreciated, in other embodiments, other pressure values and/or target temperatures can be used.

The placement of the engraved groove 208 ("groove placement") may be a function of cell film surface area, battery type, and other factors. In addition to the groove thickness, the engraved grooves 206 can be characterized by a quantity.

In FIG. 2, the groove placement includes one or more designs 218 on each side. For example, the groove placement may include an engraved groove on each of the two wide lateral sides. In another example, the groove placement may include an engraved groove on each of the two narrow lateral sides. In another example, the groove placement may include an engraved groove on each of the top and the bottom.

The engraved grooves may also be characterized by their shape or design 218. The design 218 of the engraved groove(s) may be a function of cell film surface area, battery type, and other factors. In various embodiments, the design 218 may be characterized by a length and width (i.e., area dimensions).

In an embodiment, the groove placement incorporates a groove design, such as, by including a first and a second engraved groove, arranged concentrically on the cell film. In an embodiment, the groove placement may include a first and a second engraved groove, arranged concentrically on one of the two wide lateral sides. In an embodiment, the groove placement may include a first and a second engraved groove, arranged concentrically on one of the two narrow lateral sides. In an embodiment, the groove placement may include a first and a second engraved groove, arranged concentrically on one of the top or the bottom. In an embodiment, the groove placement may include at least a first and a second engraved groove, arranged concentrically on any of a wide lateral side, a narrow lateral side, a top and a bottom.

In an embodiment, the designs 218 of the engraved grooves 206 are substantially concentric. In an embodiment, the designs 218 of the engraved grooves 206 are substantially rectangular. In an embodiment, a length of the engraved grooves 206 may be plus or minus 20% of a perimeter of a surface that it is placed on.

As mentioned, when a design 218 is not a closed loop, it may incorporate a gap 216. The gap 216 may be intentionally sized to serve as a tab that keeps the flap 16 attached to the remainder of the cell film 10 surrounding a battery cell when the cell film 10 breaks open at the engraved groove 12. If the gap 216 is omitted, the flap 16 could detach from the battery cell 2, impinging on neighbor battery cells or collecting on the bottom of the battery cell 2. Hot ejected material impinging on a neighbor battery cell may cause mechanical failure and/or short-circuiting in the neighbor battery cell.

Advantageously, embodiments enable control over where the cell film 10 breaks open (i.e., it is no longer a random rupture), what predetermined pressure and target temperature shall cause the cell film 10 to break open at the engraved groove 12, and whether material is ejected.

Figure 3:
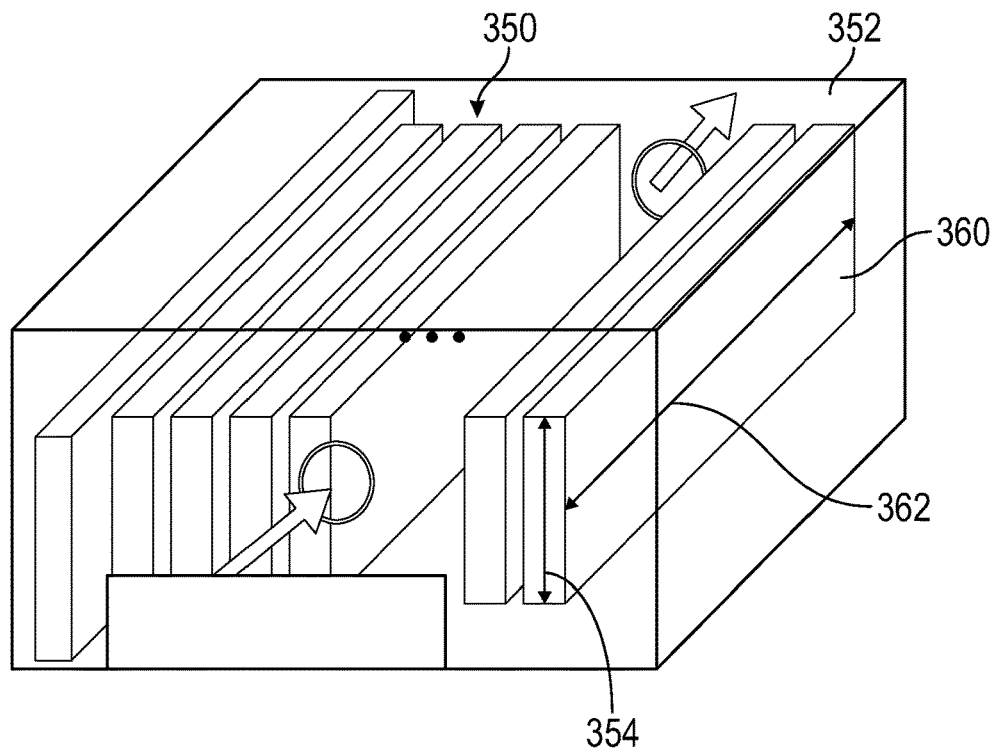
FIG. 3 illustrates a battery module in which the one or more battery cells are immersed in a thermal control fluid for cooling, in accordance with various embodiments of the present disclosure.

In FIG. 3, a battery module 350 is shown, comprising one or more battery cells 360 that are arranged side-by-side, horizontally (e.g., as shown, each battery cell 360 having its wide lateral sides 252 stacked in an upright position, top 254 on top, bottom 254 sides on bottom). In a non-limiting example, the battery cell 360 has width (362) 550 millimeters (shown on the wide lateral side), and height (354) 110 millimeters. In the depicted embodiment, the battery cells are fully immersed in thermal cooling fluid 352. In other embodiments, the battery cells may be only partially immersed in thermal cooling fluid 352.

When the battery cells 2 are operating in the normal temperature range, the pressure within the enclosed cell film 10 pouch stays below the predetermined pressure. As the battery cells 2 are heated above the normal temperature range, due to a fault or for another reason, the pressure of the gases 18 increases above the predetermined pressure and the engraved grooves 206 break open in one or more locations along an engraved groove 206. The thermal control fluid 22 from the enclosure enters the opening created, and contacts components in the battery cell 2 (e.g., the battery core) to lower temperature.

Figure 4:
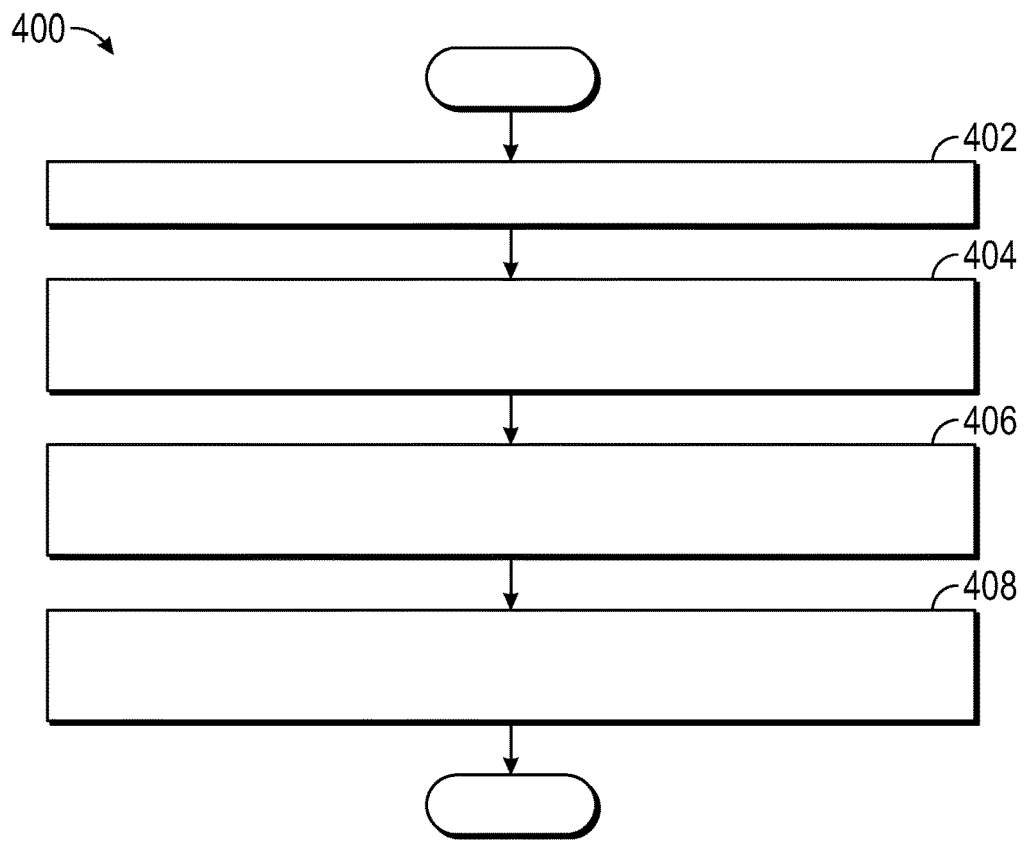
FIG. 4 depicts a method for making a battery cell, in accordance with various embodiments of the present disclosure.

Turning now to FIG. 4, and with continued reference to FIGS. 1-3, a method 400 for making a battery cell is described. For illustrative purposes, the following description of the method 400 may refer to elements mentioned above in connection with FIGS. 1-3. In various embodiments, portions of method 400 may be performed by automated computer aided design tools. It should be appreciated that method 400 may include any number of additional or alternative operations and tasks, the tasks shown in FIG. 4 need not be performed in the illustrated order, and method 400 may be incorporated into a more comprehensive procedure or method, having additional functionality not described in detail herein. Moreover, one or more of the tasks shown in FIG. 4 could be omitted from an embodiment of the method 400 if the intended overall functionality remains intact.

At 402, the method is initialized with a battery core having a battery core type, e.g., Li-ion. At 404, a battery core (also referred to as simply "core") of a battery type, such as Li-ion, is utilized. The battery core is enclosed within a cell film configured as a pouch, the cell film having an initial thickness. The pouch is understood to be sealed. At 406, at least one engraved groove is placed in the cell film, by thinning an area of the cell film to a groove thickness that is less than the initial thickness. At 408, the groove thickness is configured to break open responsive to a predetermined gas pressure. In other embodiments, the groove thickness is configured to break open responsive to a target temperature in the core.

In various embodiments, additional method 400 steps may provide more detail on engraved groove placement and design, consistent with the discussion above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A battery cell, comprising:
   a core of a battery type;
   a cell film having an initial thickness, the cell film configured as a pouch enclosing the core; and
   at least one groove in the cell film, the at least one groove characterized by a groove thickness that is less than the initial thickness, a first groove of the at least one groove comprising:
   a first end and a second end;
   a gap disposed between the first end and the second end; and
   a tab disposed within the gap and extending between the first end of the first groove and the second end of the first groove, the tab being centrally disposed with respect to an inner surface and an outer surface of the first groove,
   wherein the battery cell is at least partially immersed in a thermal cooling fluid within a housing, and
   wherein the groove thickness of the first groove is configured to break open responsive to a predetermined gas pressure in the pouch and enable the thermal cooling fluid to enter into the pouch and contact components of the battery cell, and the tab of the first groove is configured to remain attached to the cell film of the first groove when the groove thickness breaks open.

2. The battery cell of claim 1, wherein the predetermined gas pressure is selected to represent a threshold below which the pouch remains intact for the core of the battery type.

3. The battery cell of claim 1, wherein the pouch is characterized by two equally sized wide lateral sides.

4. The battery cell of claim 3, wherein the pouch is further characterized by two equally sized narrow lateral sides, a top and a bottom.

5. The battery cell of claim 4, wherein the at least one groove comprises a groove design that includes a substantially rectangular shape having a length of plus or minus 20% of a perimeter of the wide lateral sides.

6. The battery cell of claim 1, wherein the at least one groove is further characterized by a groove placement, and the groove placement includes a groove on each of two wide lateral sides.

7. The battery cell of claim 1, wherein the at least one groove is further characterized by a groove placement, and the groove placement includes a groove on each of two narrow lateral sides.

8. The battery cell of claim 1, wherein the at least one groove is further characterized by a groove placement, and the groove placement further includes the first groove and a second groove, arranged concentrically on the cell film.

9. A method for making a battery cell for a battery core, comprising:
   providing the battery core of a battery type;
   enclosing the battery core within a cell film configured as a pouch, the cell film having an initial thickness;
   creating at least one groove by thinning an area of the cell film to a groove thickness that is less than the initial thickness, a first groove of the at least one groove comprising:
   a first and a second end;
   a gap disposed between the first end and the second end; and
   disposed within the gap and extending between the first end of the first groove and the second end of the first groove, the tab being centrally disposed with respect to an inner surface and an outer surface of the first groove;
   at least partially immersing the battery cell in a thermal cooling fluid within a housing;
   configuring the groove thickness of the first groove to break open responsive to a predetermined gas pressure to enable the thermal cooling fluid to enter into the pouch and contact components of the battery cell; and
   configuring the tab of the first groove to remain attached to the cell film of the first groove when the groove thickness breaks open.

10. The method of claim 9, further comprising selecting the predetermined gas pressure to represent an undesired thermal excursion for the battery core as a function of the battery type.

11. The method of claim 9, further comprising forming the pouch to include two equally sized wide lateral sides.

12. The method of claim 11, further comprising forming the pouch to include two equally sized narrow lateral sides, a top and a bottom.

13. The method of claim 9, further comprising creating to further have a groove design.

14. The method of claim 13, wherein the groove design includes a substantially rectangular shape having a length of plus or minus 20% of a perimeter of a wide lateral side of the pouch.

15. The method of claim 11, further comprising placing a groove on each of the two wide lateral sides.

16. The method of claim 12, further comprising placing a groove on each of the two narrow lateral sides.

17. The method of claim 9, wherein the at least one groove is further characterized by a groove placement, and the groove placement further includes the first groove and a second groove, arranged concentrically on the cell film.

18. A battery module, comprising:
- a plurality of battery cells, each battery cell comprising a respective core of a battery type and a cell film having an initial thickness, the cell film configured as a pouch enclosing the respective core; and
- at least one battery cell further comprising at least one groove in the respective cell film, the at least one groove characterized by a groove thickness that is less than the initial thickness, a first groove of the at least one groove comprising:
  - a first end and a second end;
  - a gap disposed between the first end and the second end; and
  - a tab disposed within the gap and extending between the first end of the first groove and the second end of the first groove, the tab being centrally disposed with respect to an inner surface and an outer surface of the first groove;
- wherein the battery cell is at least partially immersed in a thermal cooling fluid within a housing, and
- wherein the groove thickness of the first groove is configured to break open responsive to a gas pressure in the respective core and enable the thermal cooling fluid to enter into the pouch and contact components of the battery cell, and the tab of the first groove is configured to remain attached to the cell film of the first groove when the groove thickness breaks open.

19. The battery module of claim 18, wherein the gas pressure is associated with a target temperature, and wherein the target temperature is selected to represent for the core of the battery type, and the at least one groove has a length of plus or minus 20% of a perimeter of a wide lateral side of the pouch.

20. The battery cell of claim 1, wherein a first initial thickness of a first cell film including the first groove has a first initial thickness of 0.5 millimeters and the first groove has a first groove thickness that is less than 0.075 millimeters.

* * * * *